United States Patent [19]

O'Connor

[11] 4,006,876

[45] * Feb. 8, 1977

[54] ACTUATOR CONTROLLED INSTRUMENT SUPPORT STAND

[76] Inventor: Chadwell O'Connor, 2024 Galaxy Drive, Newport Beach, Calif. 92660

[ * ] Notice: The portion of the term of this patent subsequent to Nov. 26, 1991, has been disclaimed.

[22] Filed: Oct. 15, 1974

[21] Appl. No.: 514,298

Related U.S. Application Data

[63] Continuation-in-part of Ser. No. 406,542, Oct. 15, 1973, Pat. No. 3,850,395.

[52] U.S. Cl. .............................. 248/171; 248/188.3
[51] Int. Cl.² ...................................... F16M 11/38
[58] Field of Search .......... 248/407, 408, 411, 412, 248/168, 169, 170, 171, 188.2, 188.3; 91/466

[56] References Cited

UNITED STATES PATENTS

| | | | |
|---|---|---|---|
| 2,617,257 | 11/1952 | Douglas | 91/466 |
| 2,831,466 | 4/1958 | Stueland | 91/466 |
| 3,722,847 | 3/1973 | O'Connor | 248/171 |
| 3,795,378 | 3/1974 | Clarke | 248/168 |
| 3,850,395 | 11/1974 | O'Connor | 248/171 |

Primary Examiner—Robert A. Hafer
Attorney, Agent, or Firm—Leydig, Voit, Osann, Mayer & Holt, Ltd.

[57] ABSTRACT

An improved instrument support structure including a post telescoped in a column, with means for adjusting their combined length, and three legs pivoted at the bottom of a column for swinging movement from adjacent the column to extended, base defining positions. The legs are locked by extendible struts including fluid actuators with one strut interconnecting each leg with the column. Fluid from a reservoir on the column is directed to all actuators when the legs are extended, and then valving is closed to shut off fluid intercommunication and lock the legs. The valving further includes provision for permitting one of the leg actuators to be manually pumped for drawing fluid from the reservoir and forcing fluid into the other leg actuators for easy setup of the structure. The valving also includes manual control for selectively setting the different valve positions, and detent button means permits free rotation of the valve control in one direction while imparting a positive feel of the various settings and normally prevents rotation of the control in the other direction, but may be overridden by manually depressing the button. A further modification utilizes double-acting actuators and a return flow control valve to lock the legs from movement in either direction and thus allow the column to be "sandbagged".

2 Claims, 19 Drawing Figures

ACTUATOR CONTROLLED INSTRUMENT SUPPORT STAND

This application is a continuation-in-part of my application Ser. No. 406,542, filed Oct. 15, 1973, now U.S. Pat. No. 3,850,395.

The present invention relates generally to support structures for instruments such as cameras, transits and the like, and concerns more particularly a portable instrument support stand including positively controlled actuation for setting up the collapsible legs in their base defining positions.

There is disclosed and claimed in Chadwell O'Connor U.S. Pat. No. 3,722,847, issued Mar. 27, 1973, an instrument support structure adapted to collapse compactly which includes a telescoping column and three legs pivoted at the bottom of the column for swinging movement from adjacent the column to extended, base-defining positions. The legs which are pivotally connected to the column are also interconnected with extendible struts carrying fluid actuators supplied through a valve with fluid from a reservoir carried by the column. The valve may be selectively set to (1) open the reservoir to all of the actuators allowing the struts to extend and the legs pivot to their base-defining positions, (2) shutting off the reservoir while allowing fluid communication between the actuators so that automatic simultaneous adjustment of the legs occurs while repositioning, and (3) shutting off all intercommunication of fluid between the individual actuators and the reservoir so as to lock the struts at given lengths and thus lock the legs in given positions.

While the general arrangement for the instrument support structure of the aforementioned patent is totally satisfactory and does constitute a substantial improvement over other types of conventional tripods, nevertheless certain disadvantages are incurred in setting up the stand particularly when a heavy instrument such as a television camera has been mounted to the stand due to the manipulative steps needed to individually unfold the legs and the awkwardness of balancing and supporting the load of the camera at the opposite end of the stand while working at the opposite end. Simply permitting the legs to freely fall by allowing fluid to rush into the actuators from the reservoir when the legs are released from the over-center collapsed position can be hazardous especially where the legs themselves are relatively heavy members.

When such a support structure is static, only compression loads are encountered in the actuators holding the column in adjusted position. However, in some situations — as when a camera is to be carried on a moving truck, or high winds are being encountered — it is common to sandbag the tripod or instrument support stand, i.e., weigh down the ground engaging legs with sandbags or otherwise secure the legs to the underlying surface. In these situations, the leg actuators could be subject to tension loads which, with the single acting actuators of the above-identified patent, would simply extend the leg supporting struts and result in instability.

Accordingly, it is a general aim of the present invention to provide an improved instrument support which overcomes the foregoing disadvantages and which is characterized by permitting positive controlled actuation to unfold the legs for setup.

A further object is to provide a stand as characterized above that allows the user to more easily uncollapse the legs so as to minimize the manipulative steps required for placing the stand in a self-supportable position even where the stand has already been attached to a relatively heavy instrument.

Still another object, though more specific, is to provide a stand of the foregoing type wherein one of the legs may be utilized to positively pump fluid from the reservoir into the fluid actuators of the other legs to set up the stand. In this connection it is a more specific object of the invention to provide a selective valve arrangement which is yet more versatile than the valve arrangement of the aforementioned O'Connor patent and includes a position for permitting one of the legs to be used as a pump actuator.

It is an object of a further modification of the invention to provide leg supports that will withstand tension as well as compression loads and thus permit the stand to be sandbagged for holding the supported instrument steady.

Other objects and advantages of the invention will become apparent upon reading the following detailed description and upon reference to the drawings.

FIG. 13 is a schematic showing the valve cam and plunger configuration embodied in the valve of FIG. 12; and FIGS. 14 through 18 are schematics of the alternate circuit configurations produced by different positions of the valve illustrated in FIG. 12.

While the invention is susceptible of various modifications and alternative forms, certain specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Figures 1, 2, 3, 3A:
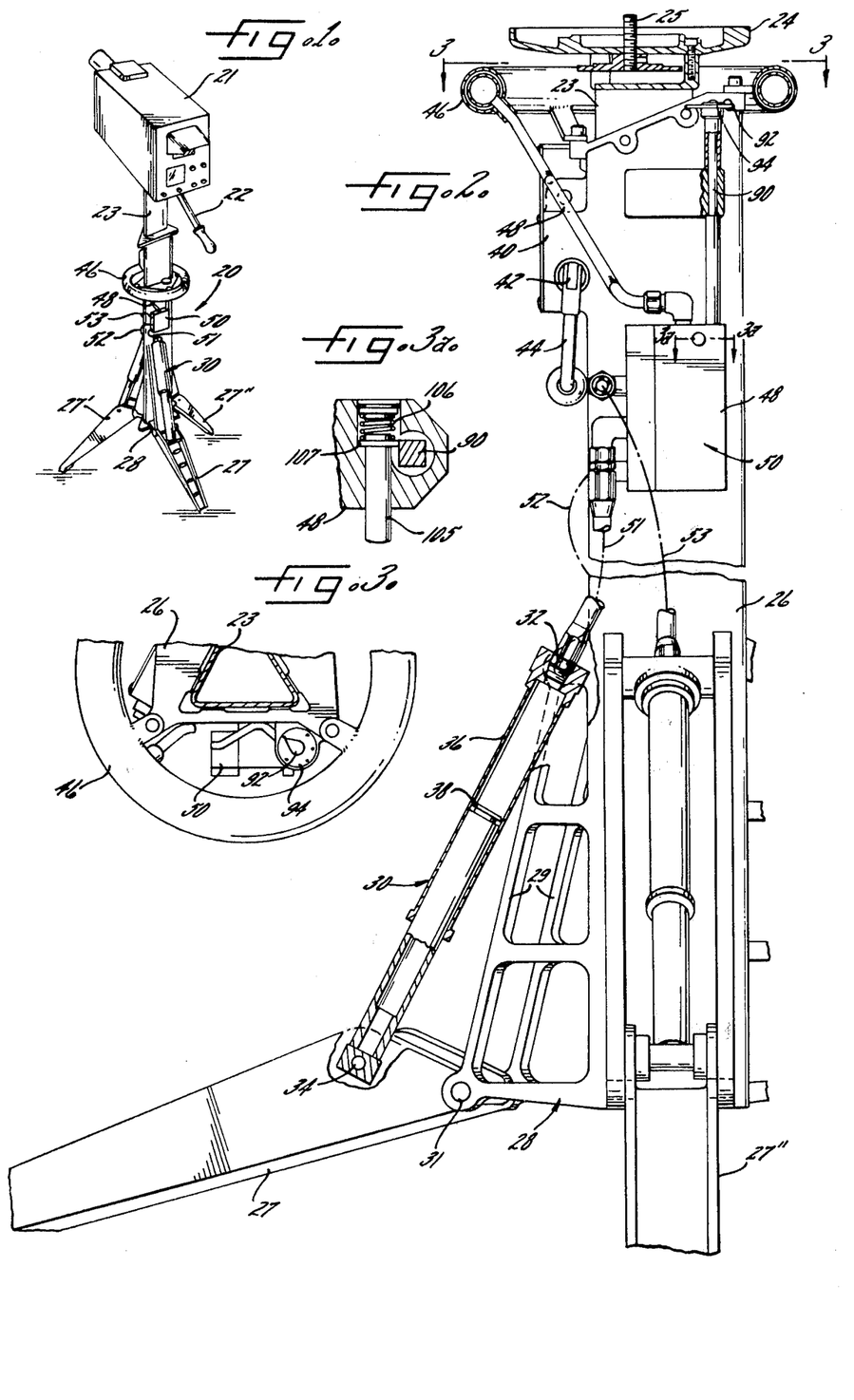
FIG. 1 is a perspective of a support stand embodying the invention and here shown mounting a television camera.
FIG. 2 is an enlarged partial section of the support stand illustrated in FIG. 1.
FIG. 3 is a fragmentary section view taken approximately along the line 3—3 in FIG. 2.
FIG. 3a is an enlarged section taken approximately along the line 3a–3a in FIG. 2.

Referring to FIG. 1, there is shown an instrument stand generally indicated at 20, embodying the invention and mounting, for the purpose of illustration, a camera 21 on a panhead 22. The stand 20 includes a post 23, with an upper plate 24 (FIG. 2) and a mounting screw 25 permitting attachment to the panhead 22, that is slidably fitted in a column 26. Pivotally connected at the lower end of the column 26 are a plurality of legs 27, 27' and 27'' (there being three in number), the arrangement being such that the legs swing between positions adjacent the column 26 and positions extending from the column and defining a base for supporting the structure 20. For further details of the arrangement of the legs and column, reference is made to the aforesaid O'Connor U.S. Pat. No. 3,722,847.

In brief, the column 26 is preferably triangular in cross-section and the three legs 27, 27' and 27'' are pivoted on brace members 28 integrally formed with the column 26. Referring to FIG. 2, the braces 28 are also generally triangular shaped and include spaced apart webs 29 having aligned pivot openings at the outermost ends to receive a pin 31 which passes through an opening in the leg 27. A plurality of struts 30 including fluid actuators, one for each leg, are connected between an upper pivot point 32 on the braces 28 and respective pivot points 34 on the legs 27. The fluid actuators include cylinder portions 36 and piston portions 38 (FIG. 2). The legs 27 are open in cross-section so as to encase the actuator struts 30 when the legs pivot against the flat sides of the column 26. In addition, the legs when pivoted against the flat sides of the column 26 pass between the webs of the braces 28.

In order to facilitate adjustment of the post 32 with respect to the column 26, a gear train arrangement (not shown) is carried in a protruding casing portion 40 (FIG. 2) formed with column 26 and a drive shaft 42 projecting outwardly from the casing 40 pivotally receives a crank handle 44. It will be appreciated by those skilled in the art, that the drive gear of the gear train engages with a rack carried by the post 23 so that rotation of the crank handle 44 elevates and lowers the post with sufficient mechanical advantage being provided for handling a relatively heavy instrument carried by the upper plate 24.

In keeping with the general arrangement of the stand structure, a fluid reservoir 46 in the shape of an annulus is mounted on the column 26 with a fluid supply line 48 connecting the reservoir through valve 50 and fluid lines 51, 52, 53 to respective actuators 30 of legs 27, 27' and 27''. In the preferable form, the reservoir includes a resilient or rubber-like donut member fitted within an outer chamber so that the contained fluid is under slight pressure, when the legs 27 are collapsed up against the sides of the column 26, and the struts 30 over-center the leg pivot axis thereby permitting the slight reservoir pressure to hold the legs against the column.

In accordance with the present invention, means including valve 50 are provided for selectively (1) regulating the opening of the fluid supply line from the reservoir to all of the actuators for controlled opening and generally free collapse of the legs, (2) closing the supply line of the reservoir while allowing intercommunication of fluid between the actuators for leveling adjustments of the legs, (3) shutting off intercommunication of fluid between the individual actuators and the reservoir to lock the actuators at given lengths and thus lock the legs in given positions, and (4) permitting one of the legs through its actuator to be operated as a pump to positively draw fluid from the reservoir and force the fluid to the actuators of the other legs for easy set-up of the instrument stand.

Figure 4:
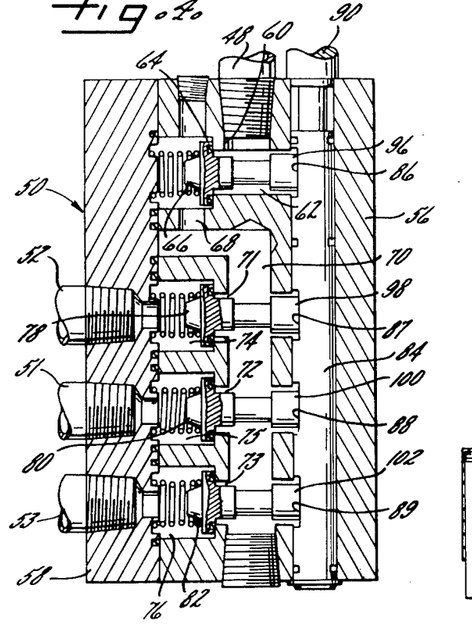
FIG. 4 is an enlarged sectional view of the valve construction for use with the apparatus of FIG. 1.

Referring to FIG. 4, the valve 50 includes a body 56 and a head 58 sealingly attached to the body. An inlet opening 60 in the body receives the fluid supply line 48 from the reservoir 46. The inlet opening 60 communicates with a transverse port 62 having a valve seat 64 against which spring biased valve member 66 acts to seal and unseal the port 62. The outlet side of port 62 is connected by a passage opening 68 to a generally L-shaped passage 70 which communicates with seat openings 71, 72, 73 to respective outlet chambers 74, 75, 76. Disposed in each outlet chamber 74, 75, 76 is a respective spring biased valve member 78, 80, 82 to open and close its particular chamber with respect to the passage 70.

In the instant arrangement, outlet chambers 74, 75, 76 are respectively connected to actuator supply lines 52, 51, 53.

For controlling the opening and closing of the valves a longitudinally extending rotatable cam shaft 84 is provided including a plurality of cam faces 86, 87, 88 and 89 disposed about the periphery of the shaft. The cam shaft 84 is rotatably set through an upwardly projecting stem 90 that receives a knob 92 for manual positioning with respect to an indicator disk 94 (FIGS. 2 and 3).

Referring again to FIG. 4, each valve member 66, 78, 80, 82 includes a respective follower 96, 98, 100, 102 cooperating with their particular cam faces 86, 87, 88, 89.

Figure 5:
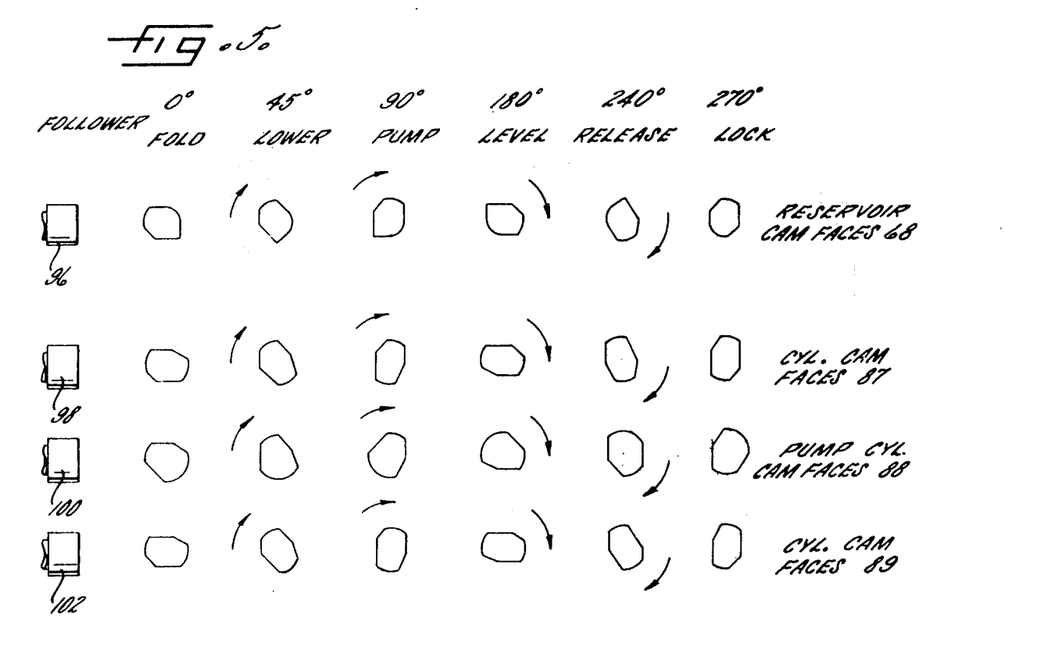
FIG. 5 is a schematic chart showing of the valve cam positions for each of the operative setting selections of the valve control.
Figure 6:
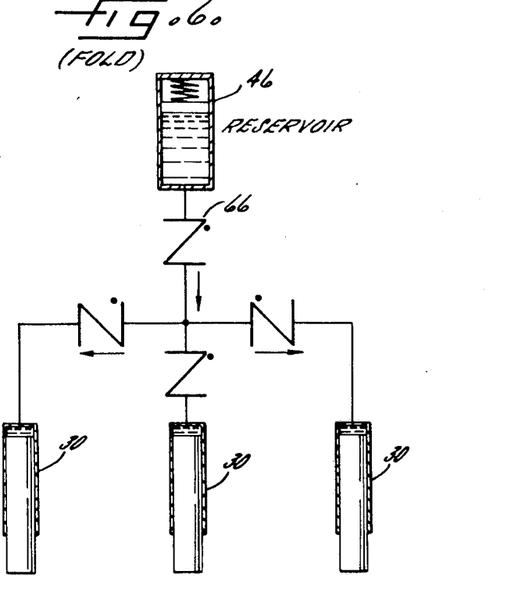
FIGS. 6, 7, 8, 9 and 10 are schematic drawings of the fluid connections for the reservoir and actuators with each of the selective valve positions available in the respective order showing fold, lower, lock, level and pump settings.

Referring to FIG. 5 there is a diagrammatic representation of the various cam face settings to illustrate the different selectable functions attainable through the valve 50. Thus, in the illustrative arrangement the control knob 92 is provided with six angular position settings with a corresponding number of cam faces 86, 87, 88 and 89. Taking the first control knob position which has been designated the 0° or "fold" position, here the cam surfaces are such that all of the followers 96, 98, 100 and 102 are urged fully to the left as viewed in FIG. 4 so that all the respective valves 66, 78, 80, 82 are in the "full" open positions. Thus, fluid may freely flow between the reservoir supply line 48 and the actuator lines 51, 52, 53 particularly when the legs are to be folded or collapsed since in this instance the fluid would be driven from the actuators back into the reservoir (FIG. 6).

Figure 7:
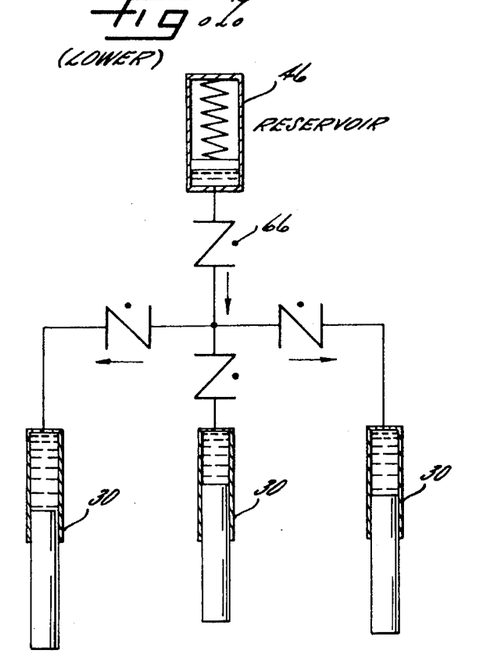

In the second column designated 45° or "lower" of the FIG. 5 diagram there is shown cam positions where upon rotation of the control knob 92 to the 45° angular position new cam faces are presented to allow the cam followers 96, 98, 100 and 102 with their respective valves 66, 78, 80, 82 to move to the right as viewed in FIG. 4 so that all of the valves are in a half open position with respect to their seats. This allows the legs to be lowered at a controlled rate without "falling" because of a rush of fluid to or from the reservoir (FIG. 7).

In keeping with an important aspect of the present invention, there is shown in the third column a 90° position for the control knob 92 that is designated "pump" wherein the cam face 86 controlling the follower 96 of the reservoir inlet valve 66 permits the valve to be seated, normally closing off the fluid from the supply line 48. Similarly, cam faces 87 and 89 to two of the actuator cylinders permit their cam followers 98, 102 to be moved to the extreme right as viewed in FIG. 4 so that valves 78, 82 are also seated. Cam face 88, however, holds follower 100 to the left keeping valve 80 off of its seat so that there is some fluid communication through line 51 to the valve passage 70.

Figure 10:
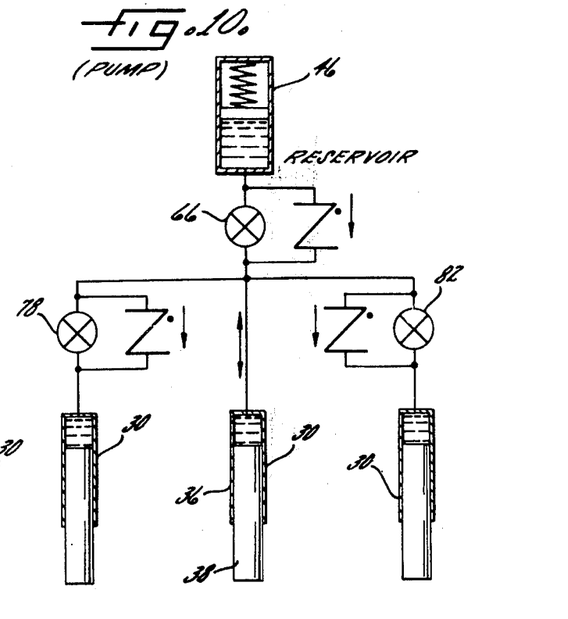

In this instance as diagrammatically indicated in FIG. 10, the middle actuator cylinder for leg 27 is operable as a pump in that manually pulling the leg 27 downwardly moves the piston 38 downwardly creating a suction in the fluid line through open valve 80 and passageway 70 (FIG. 4) which draws valve member 66 away from its seat drawing more fluid from the reservoir into the pump cylinder. Moving the leg 27 upwardly then pushes the fluid out through open valve 80 into passage 70 which causes valve member 66 to again seat thereby preventing the fluid from flowing back into the reservoir while at the same time unseating valve members 78 and 82 forcing the fluid into the other actuator cylinders 30 for legs 27' and 27''. Repeated pumping actions on leg 27 continues the fluid action and valve movement described to forcibly move the actuator cylinder pistons 36 for the other legs downwardly until they reach the desired position and pumping is discontinued.

Figure 9:
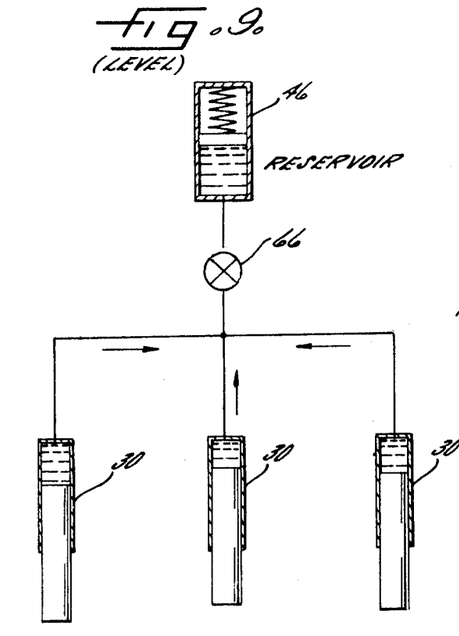

Rotation of the control knob 92 to the 180° position for that designated "level" (FIG. 5) brings new cam faces 86, 87, 88, 89 in position so that the valve 66 is closed to shut off the reservoir, but intercommunication between the actuator cylinders for all three legs occurs since valves 78, 80 and 82 are all held open. In this situation as shown diagrammatically in FIG. 9, the relative positions of the legs may be varied to level the structure 20 on uneven or sloping ground as well as in different vertical heights, but the adjustment of the legs will be automatic since the column is being positioned with fluid intercommunication between all of the actuator cylinders.

Figure 8:
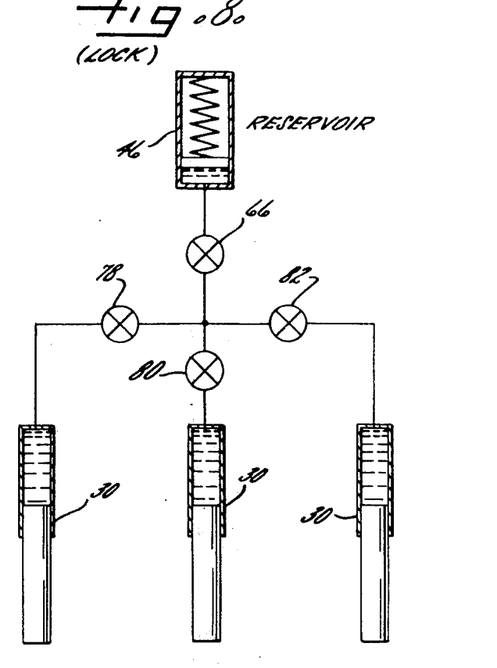

At this point, the control knob 92 may be moved clockwise to the 270° position or that designated "lock" wherein all the cam faces 86–89 permit the cam followers to move to the extreme right and all the valves are closed (FIG. 4). As illustrated diagrammatically in FIG. 8, with all the valves closed the actuator cylinders are shut off from one another and the legs 27, 27', 27'' are locked in their adjusted positions.

In the preferred embodiment, provision is made for permitting the control knob 92 and stem 90 operating cam shaft 84 to be freely rotated in the clockwise position, but with a "feel" or detent action as each of the selectable angular positions is reached. Also, the arrangement is such that an override must be manually operated to rotate the control knob 92 in the counterclockwise direction.

In keeping with this aspect of the invention, referring to FIGS. 3 and 3a conjointly, the valve body 48 carries an outwardly projecting detent button 105 normally urged outwardly by a spring 106. Adjacent the inner end of the button 105 is a peripheral flange 107 that bears against the square cross-section of stem 90 adjacent the flange. As shown in FIG. 3a, rotation of the stem 90 in the clockwise direction will bear against the flange 107 and draw the button 105 inwardly against the spring permitting free rotation of the stem and cam shaft 84 extending in the valve body. Rotation of the stem 90 in the counterclockwise direction is normally prevented by flange 107 unless the button 105 is depressed moving the flange 107 away from the flat sides of the stem 90.

It will be appreciated that when the stem 90 is rotated in the clockwise direction due to the square configuration of stem 90 reaction pressure is released at each 90 degree angular position providing a feel to the user that one of the main positions of fold, pump, level or lock has been set. Each setting is positive in the sense that counterclockwise movement is prevented without depressing the button 105 and continued movement of the knob 92 in the clockwise direction is again against a build-up reaction force room moving the button 105 against the spring 106 pressure. While the square cross-sectional shape of the stem provides for only four main settings, other polygonal shaped cross sections may be used to obtain desired numbers of positive settings.

As another feature of the present invention, provision is made for permitting release of pressure on the cylinder side of one valve to equalize the pressures on the valves and making it easier to rotate the cam shaft when taking the instrument off the lock setting where all of the valves have been closed.

In this regard, referring to FIG. 5 there is shown the "release" setting at 240° where the cam faces 86, 87 and 98 permit their respective followers 96, 98 and 102 to remain to the extreme right as viewed in FIG. 4 leaving the valve members associated therewith closed while cam face 88 moves follower 100 to the left partially opening valve 80 about half-way. This action is sufficient to equalize the pressures on both sides of all of the actuator cylinder valves and the control knob 92 may be more easily turned in the counterclockwise direction while depressing the button 105 to position the control knob at the level setting or at the fold setting if the legs are to be collapsed.

While the illustrative valve arrangement has been shown with certain angular positions for the main settings of fold, pump, level and lock and a particular one of the legs has been arranged to be the pump actuator, it will be appreciated that the cam faces may be arranged in other desired manners to have the particular settings in other angular positions or in other orders as well as using any of the other leg actuator cylinders as the pump lever.

Figures 11, 12:
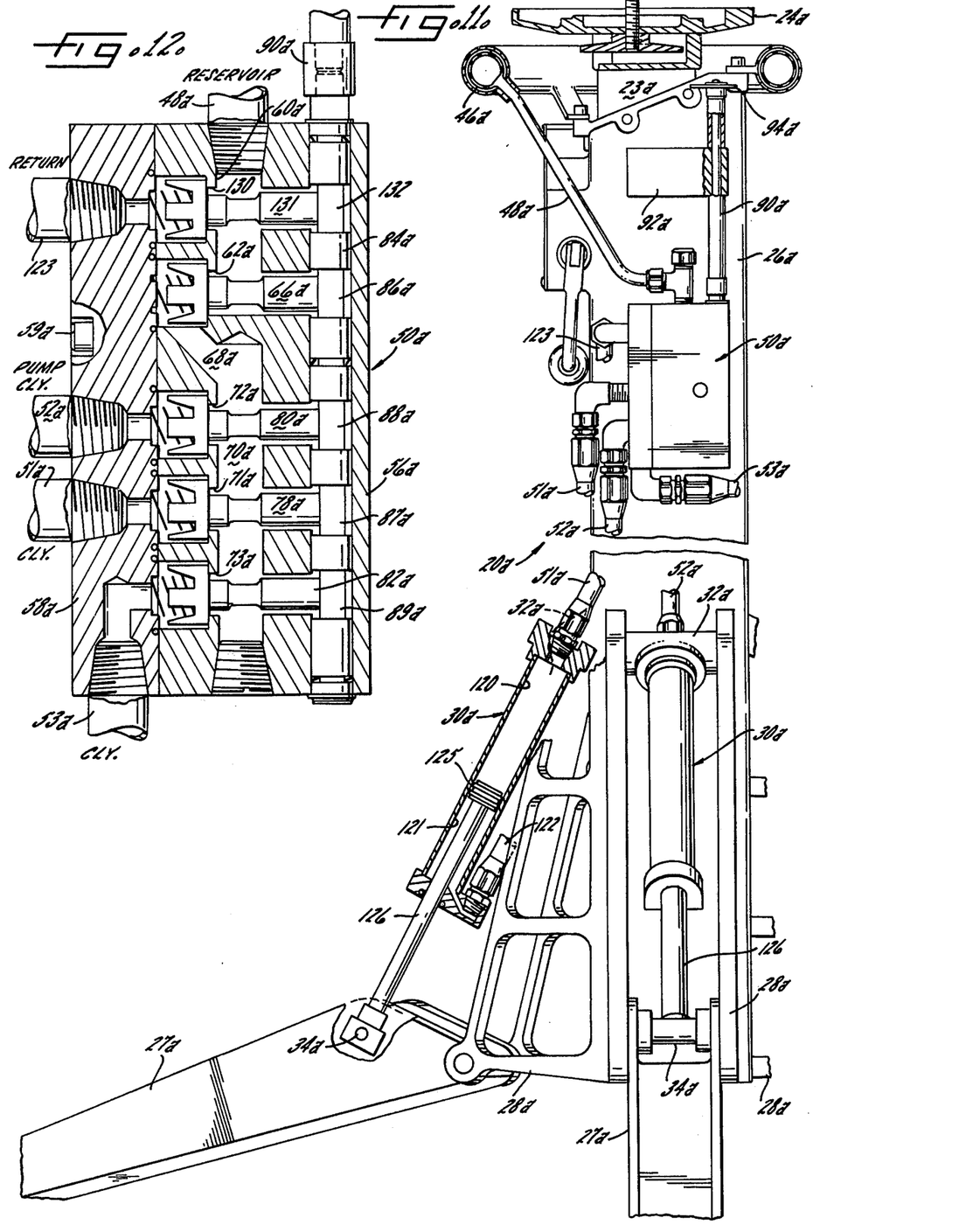
FIG. 11 is a fragmentary partially sectioned side elevation of a modification of the support stand embodying the invention.
FIG. 12 is an enlarged section of the valve used with the stand of FIG. 11.
Figures 16, 17, 18:
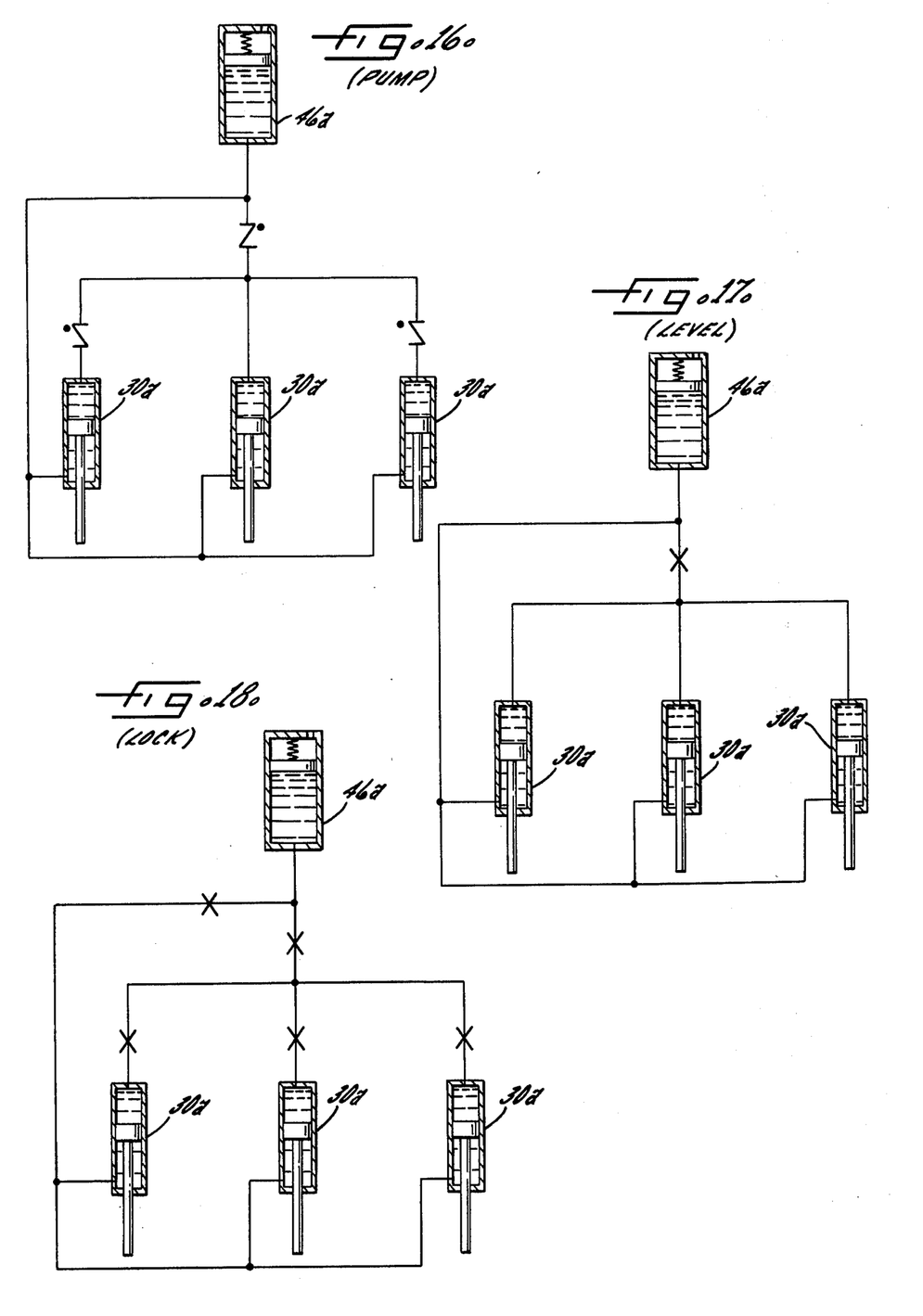
Figure 23:
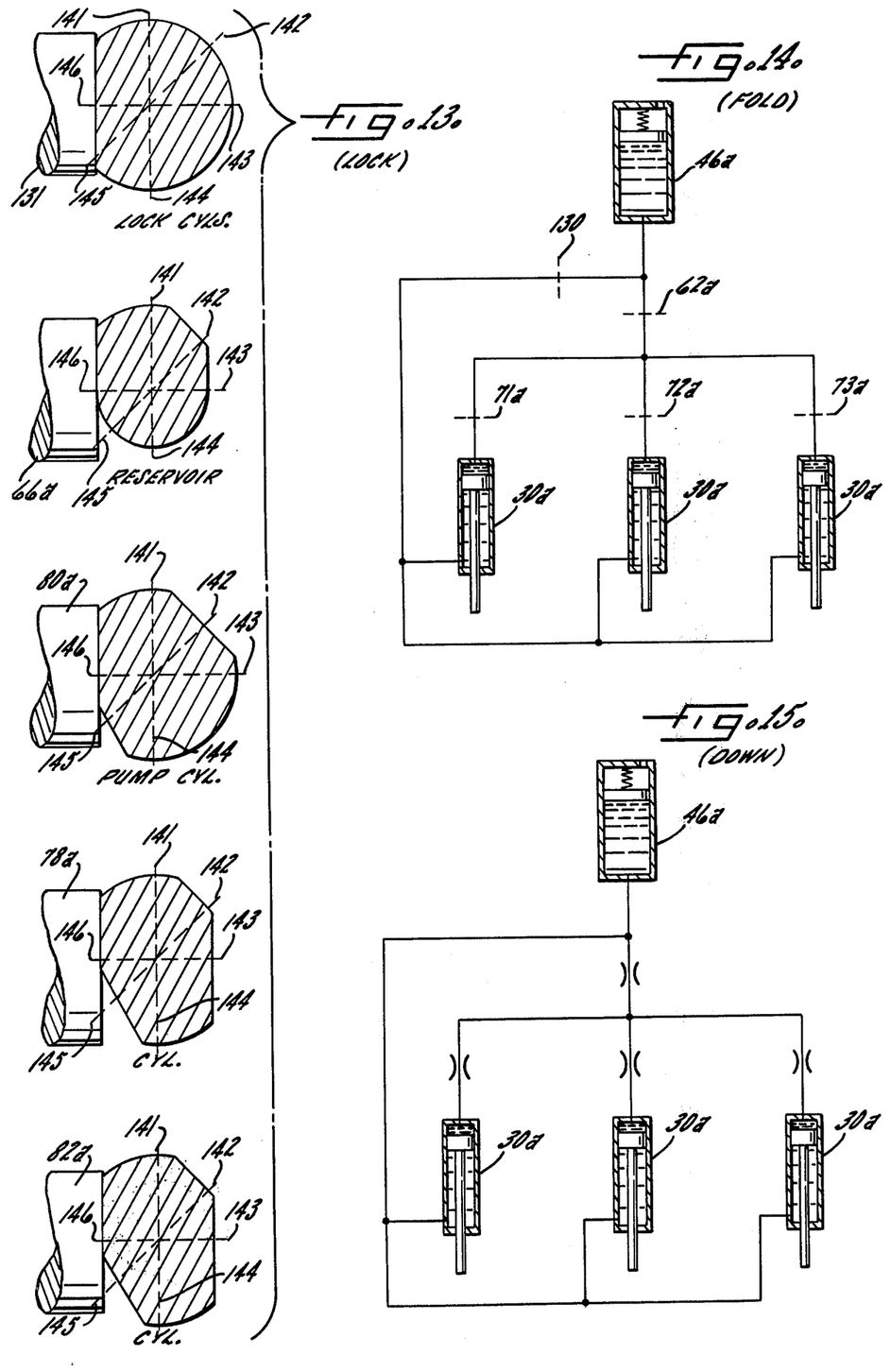

Turning next to FIG. 11, there is shown a modification of the invention in which parts corresponding to those previously described have been given the same reference numerals with the distinguishing suffix *a* added. The instrument stand 20*a* includes a post 23*a* carrying an upper plate 24*a* and being slidably fitted in a column 26*a*. Pivotally connected at the lower end of the column 26*a* are a plurality of legs 27*a* mounted on brace members 28*a*. A plurality of struts 30*a*, one for each leg 27*a*, are connected between upper pivot points 32*a* and respective pivot points 34*a* on the legs 27*a*.

A fluid reservoir 46*a* in the shape of an annulus is mounted on the column 26*a* and connected by a fluid supply line 48*a* to a control valve 50*a* which, in turn, is connected through fluid lines 51*a*, 52*a* and 53*a* to upper chambers 120 defining a portion of an actuator embodied in each of the struts 30*a*.

In accordance with this aspect of the invention, the actuators making up the struts 30*a* are double-acting and the lower or piston chambers 121 are connected by fluid lines 122 to a single line 123 leading to the top of the valve 50*a* so that the valve, by closing the lines 122, 123, locks the actuator-struts 30*a* against tension loads. Each of the struts 30*a* include a piston 125 riding in, and defining a barrier between, the chambers 120, 121, and piston rods 126 define the lower portions of the struts 30*a* which are connected to the pivot points 34*a*.

The valve 50a includes a valve body 56a closed by a head 58a, and a plurality of screws 59a, only one of which is shown, secure the head 58a to the body 56a and the entire valve assembly 50a to the column 26a.

An inlet opening 60a the valve body 56a communicates with the fluid supply line 48a from the reservoir 46a. The inlet opening 60a communicates with a valve port 62a having a valve seat against which a spring biased valve member 66a acts to seal and unseal the port 62a. The outlet side of the port 62a is connected by a passage opening 68a leading to a longitudinal passage 70a which communicates with valve ports 71a, 72a and 73a. Spring biased valve members 78a, 80a and 82a open and close the respective ports 71a–73a. Each of the latter openings lead, respectively, to the lines 51a–53a which, as explained above, open to the upper actuator chambers 120 in the respective struts 30a.

In addition to the valve structure already described, which can be seen corresponds with structure found in the valve 50, the valve 50a includes another seat and valve port 130 which is open and closed by a spring biased valve member 131. The port 130 connects the reservoir line 48a with the fluid return line 123 that is coupled to the lower chambers 121 of the actuator-struts 30a.

For controlling the opening and closing of the five valve ports in the valve 50a, a longitudinally extending rotatable cam shaft 84a is journalled in the valve body 56a and provided with a plurality of cam faces 86a, 87a, 88a, 89a and 132 engaging the respective valve members 66a, 78a, 80a, 82a and 131. The cam shaft 84a is rotatably set through an upwardly projecting stem 90a on which is mounted a positioning lever 92a and an indicator disk 94a. As was described in connection with the valve 50, rotation of the shaft 94a causes the cam faces 86a–89a, 132 to act against the respective valve members and their spring bias to open, partially open, or allow to close the various ones of the valve ports.

The cross-sectional shapes of the cam faces on the shaft 84a are shown in FIG. 13, and the six alternate angular positions of the shaft 84a are indicated by dashed lines 141 through 146. FIGS. 14–18 show the operative conditions of the hydraulic circuit when the cam shaft 84a is in five of its possible six positions. Dashed lines in FIG. 14 indicate where, in the schematic diagrams, the valve ports 62a, 71a–73a and 130 are located in the circuit. Thus, with the cam shaft 84a in the angular position illustrated in FIG. 13, that is, with the lines 146 perpendicular to the abutting faces of the valve members, the valve is in the lock position with all valve ports closed, the circuit configuration schematically illustrated in FIG. 18. With the valve so positioned, it can be seen that the struts 80a can neither be extended nor contracted so that they will bear both tension and compression loads. This enables the support stand 20a to be sandbagged for maximum stability of the stand and the instrument supported by the stand.

The fold position of the valve 50a is obtained when the lines 141 are disposed perpendicular to the abutting surfaces of the valve members. This condition of the circuit is shown in FIG. 14 wherein all lines are open and the actuator-struts 30a can be readily collapsed to allow the legs 27a to fold up against the column 26a.

To lower the legs, the valve cam shaft 84a is turned so that the lines 142 are perpendicular to the abutting faces of the valve elements which has the effect of moving the valve element 131 to the fully open position and the other valve elements to a partially open or restricted orifice position — the circuit condition illustrated in FIG. 15. The legs can thus swing down and, by restricting fluid flow to the tops of the actuator struts 30a, control of the pivoting legs is maintained. The pump position of the valve 50a is obtained by moving the shaft 84a so that the lines 143 are perpendicular to the abutting faces of the valve elements. In this condition of the circuit, the valve element 131 remains held open, the pump cylinder valve element 80a is moved to the fully opened position, and the remaining valve elements are allowed to close under their spring bias so that they may function as one-way check valves allowing manual elongation and contraction of the pump actuator-strut 30a to draw fluid from the reservoir 46a and pump that fluid to the other actuator-struts.

When the legs 27a are down in operating position, the valve 50a is next moved to its level condition wherein, with respect to the cam shaft 84a, the lines 144 are disposed perpendicular to the abutting valve element surfaces. This puts the circuit in the condition illustrated in FIG. 17 where all valve elements are held open except for the element 66a which closes the valve port 62a. This places the actuators in intercommunication and allows the column 26a to be angularly positioned as desired with the legs 27a remaining firmly in contact with the underlying surface. When the support stand has been leveled, the valve is again placed in the lock position — the condition illustrated in FIG. 13 — and, as described above, the circuit lines are closed to solidly lock the actuator-struts 30a in adjusted position.

The sixth position of the valve 50a is that obtained by rotating the cam shaft 84a so that the lines 145 are perpendicular to the adjacent surfaces of the valve elements, and this is the release position wherein the valve element 80a is slightly moved to partially open the associated valve port for the same purpose discussed above in connection with the 240° setting of the valve 50.

Those skilled in the art will appreciate that the valve 50a and its associated hydraulic circuity remain quite compact and simple to manufacture and maintain despite the attaining of the added locking function providing the actuator-struts 30a with the ability to withstand tension as well as compression loads.

I claim as my invention:

1. In an instrument support structure including, in combination, a column, a plurality of legs pivoted at the lower end of said column for swinging movement between positions adjacent the column to positions extending from the column to define a base for supporting the column upright, a plurality of struts including double-acting fluid actuators each connected between said column and one of said legs so as to define one extendible strut for each of the legs, a reservoir mounted on said column and containing fluid, and means including a valve for selectively (1) opening said reservoir to all of said actuators so that, when so opened, the struts extend and the legs pivot to their base defining positions, (2) shutting off said reservoir while allowing intercommunication of fluid between the actuators, and (3) shutting off intercommunication of fluid between the individual actuators and between the reservoir and both ends of said double-acting actuators so as to lock said struts against both tension and compression loads.

2. An instrument support structure capable of being sandbagged down onto a supporting surface including, in combination, a column, a plurality of legs pivoted at the lower end of said column for swinging movement between positions adjacent the column to positions extending from the column to define a base for supporting the column upright, a plurality of struts including double acting fluid actuators each connected between said column and one of said legs so as to define one extendible and retractable strut for each of the legs, a reservoir mounted on said column and containing fluid, means including a valve for selectively (1) opening said reservoir to all of said actuators so that, when so opened, the struts extend and the legs pivot to their base defining positions, (2) shutting off said reservoir while allowing intercommunication of fluid between the actuators, (3) shutting off intercommunication of fluid between both ends of the individual actuators so as to lock the struts against both tension and compressing loads at given lengths and thus lock the legs in given lengths and positions, and said valve including additional selective means for permitting one of said leg actuators to be manually pumped for drawing fluid from said reservoir on the suction stroke and forcing fluid into the other actuators on the pressure stroke of said one leg actuator.

* * * * *